(12) United States Patent
Anand et al.

(10) Patent No.: US 7,870,551 B2
(45) Date of Patent: Jan. 11, 2011

(54) OPTIMIZATION OF THREAD WAKE UP FOR SHARED PROCESSOR PARTITIONS

(75) Inventors: Vaijayanthimala K. Anand, Austin, TX (US); Dean J. Burdick, Austin, TX (US); Bret R. Olszewski, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1253 days.

(21) Appl. No.: 11/419,047

(22) Filed: May 18, 2006

(65) Prior Publication Data

US 2007/0271564 A1    Nov. 22, 2007

(51) Int. Cl.
*G06F 9/455* (2006.01)
(52) U.S. Cl. .......................................... 718/1; 718/102
(58) Field of Classification Search ................. 718/100, 718/1, 102
See application file for complete search history.

(56) References Cited

U.S. PATENT DOCUMENTS

| | | | |
|---|---|---|---|
| 5,063,500 A * | 11/1991 | Shorter | 709/226 |
| 5,185,861 A | 2/1993 | Valencia | |
| 5,261,053 A | 11/1993 | Valencia | |
| 5,345,590 A | 9/1994 | Ault et al. | |
| 5,692,193 A * | 11/1997 | Jagannathan et al. | 718/106 |
| 5,802,386 A | 9/1998 | Kahle et al. | |
| 5,872,972 A | 2/1999 | Boland et al. | |
| 6,058,466 A | 5/2000 | Panwar et al. | |
| 6,243,788 B1 | 6/2001 | Franke et al. | |
| 6,615,316 B1 | 9/2003 | McKenney et al. | |
| 6,625,638 B1 | 9/2003 | Kubala et al. | |
| 6,665,699 B1 | 12/2003 | Hunter et al. | |
| 6,996,822 B1 | 2/2006 | Willen et al. | |
| 7,178,145 B2 | 2/2007 | Bono | |
| 7,318,128 B1 | 1/2008 | Dice | |
| 7,340,522 B1 * | 3/2008 | Basu et al. | 709/226 |
| 7,464,380 B1 | 12/2008 | Hempel | |
| 2002/0004966 A1 | 1/2002 | Wakat et al. | |
| 2005/0210472 A1 | 9/2005 | Accapadi et al. | |
| 2006/0036810 A1 | 2/2006 | Accapadi et al. | |
| 2006/0133418 A1 | 6/2006 | Anand | |
| 2006/0168217 A1 | 7/2006 | Anand | |

(Continued)

OTHER PUBLICATIONS

Fowler, Robert J., Kontothanassis Leonidas I., Mercury: Object-Affinity Scheduling and Continuation Passing on Multiprocessors, Springer Berlin/Heidelberg, vol. 817, pp. 661-676, 1994.*

(Continued)

*Primary Examiner*—Lewis A Bullock, Jr.
*Assistant Examiner*—Blake Kumabe
(74) *Attorney, Agent, or Firm*—Stephen R. Tkacs; Stephen J. Walder, Jr.; Matthew W. Baca

(57) ABSTRACT

A mechanism is provided for biasing placement of a software thread on a currently idle and dispatched processor. The operating system starts with the last logical processor on which the software thread ran and determines whether that processor is idle and dispatched and considers each logical processor until a currently dispatched and idle logical processor is found. If a currently dispatched and idle logical processor is not found, then the operating system biases placing the software thread on an idle logical processor.

9 Claims, 4 Drawing Sheets

U.S. PATENT DOCUMENTS

| | | |
|---|---|---|
| 2006/0206891 A1 | 9/2006 | Armstrong et al. |
| 2007/0061805 A1 | 3/2007 | Brenner |
| 2007/0271563 A1 | 11/2007 | Anand et al. |
| 2008/0235684 A1 | 9/2008 | Anand et al. |
| 2009/0235270 A1 | 9/2009 | Anand et al. |

OTHER PUBLICATIONS

M. S. Squillante, Issues in Shared-Memory Multiprocessor Scheduling: A Performance Evaluation. PhD thesis, Department of Computer Science and Engineering, University of Washington, Oct. 1990.*

U.S. Appl. No. 11/077,324, filed Mar. 10, 2005, Armstrong et al.

Anand et al., "Method, Apparatus, and Program for Heuristic Based Affinity Dispatching for Shared Processor Partition Dispatching", IBM Corporation, U.S. Appl. No. 11/419,019, filed May 18, 2006.

USPTO U.S. Appl. No. 11/419,019; Image File Wrapper printed from PAIR, Jun. 29, 2010, 1 page.

USPTO U.S. Appl. No. 12/130,064; Image File Wrapper printed from PAIR, Jun. 29, 2010, 2 pages.

USPTO U.S. Appl. No. 12/130,090; Image File Wrapper printed from PAIR, Jun. 29, 2010, 1 page.

Notice of Allowance mailed Aug. 19, 2010 for U.S. Appl. No. 11/419,019; 20 pages.

Office Action dated Aug. 5, 2010 in U.S. Appl. No. 12/130,064, 28 pages.

Response to Office Action filed with the USPTO on Nov. 4, 2010 for U.S. Appl. No. 12/130,064; 12 pages.

* cited by examiner

US 7,870,551 B2

OPTIMIZATION OF THREAD WAKE UP FOR SHARED PROCESSOR PARTITIONS

CROSS REFERENCE TO RELATED APPLICATIONS

This application is related to co-pending U.S. patent application Ser. No. 11/419,019, entitled "METHOD, APPARATUS, AND PROGRAM PRODUCT FOR HEURISTIC BASED AFFINITY DISPATCHING FOR SHARED PROCESSOR PARTITION DISPATCHING," filed on an even date herewith.

BACKGROUND

1. Technical Field

The present application relates generally to an improved data processing system and method. More specifically, the present application is directed to mechanisms for optimization of thread wake up for shared processor partitions.

2. Description of Related Art

Logical partitioning (LPAR) is the ability to make a server run as if it were two or more independent servers. When one logically partitions a server, one divides the resources on the server into subsets called logical partitions. Processors, memory, and input/output devices are examples of resources that can be assigned to logical partitions. A logical partition runs as an independent logical server with the processor, memory, and I/O resources allocated to it. Examples of the kinds of software that can be installed and run on logical partitions include the AIX®, i5/OS™, and Linux® operating systems and Virtual I/O Server software. "AIX" and "i5/OS" are trademarks of International Business Machines Corporation in the United States, other countries, or both. "LINUX" is a trademark of Linus Torvalds in the United States, other countries, or both.

The Hardware Management Console (HMC) is an example of a hardware appliance that connects to the server firmware. The HMC may be used to specify to the server firmware how to allocate resources among the logical partitions on the managed system. The HMC may also be used to start and stop the logical partitions, update server firmware code, manage Capacity on Demand, and transmit service information to service and support if there are any hardware problems with the managed system. The server firmware is code that is stored in system flash memory on the server. The server firmware directly controls resource allocations on the server and communications between logical partitions on the server.

Although each logical partition acts as an independent server, the logical partitions on a physical server can share some kinds of resources with each other. The ability to share resources among many logical partitions allows increased resource utilization on the server by shifting the server resources to where they are needed.

A processor is a device that processes programmed instructions. The more processors assigned to a logical partition, the greater the number of concurrent operations the logical partition can run at any given time. Dedicated processors are whole processors that are assigned to a single partition. Shared processors are physical processors whose processing capacity is shared among multiple logical partitions.

The ability to divide physical processors and share them among multiple logical partitions is known as Micro-Partitioning™ or shared processor logical partitioning (SPLPAR). Micro-Partitioning™ (or shared processing) allows logical partitions to share one or more processors on the server. These are referred to as the shared processor pool. "MICRO-PARTITIONING" is a trademark of International Business Machines Corporation in the United States, other countries, or both. The shared processor pool includes all processors on the server that are not dedicated to specific logical partitions or reserved for capacity on-demand. Each logical partition that uses the shared processor pool is assigned a specific amount of processor power from the shared processor pool that it may use. If the logical partition needs more processor power than its assigned amount, the logical partition may (capped/uncapped defines this) use the unused processor capacity in the shared processor pool. The amount of processor capacity that an uncapped logical partition can use is limited only by the number of virtual processors assigned to the logical partition and the amount of unused processor power available in the shared processor pool.

Virtualization is the pooling of data processing resources in a way that shields the physical nature and boundaries of those resources from the partition's operating systems and users. Virtualization of processors through shared processor partitioning involves an additional layer of software, or firmware, between the operating system(s) and the hardware. Additionally, optimizations to the operating system(s) are usually required for best performance and responsiveness.

In the operating system, when a software thread is waiting on some event (e.g., a lock wait or waiting on data to reach a socket) and the event occurs, the operating system makes the software thread runnable and determines on which logical processor to run the thread. Work to be done within an operating system is broken into processes and further into threads. Generally speaking, a process is usually, but not always, analogous to an application program. The threads of a process share the same virtual address space, but run semi-independently. Thus, while one thread is waiting for a file to be read in from disk, another thread can be performing calculations, for example. Typically, the operating system attempts to run the thread on the same logical processor to maintain cache affinity.

One very key factor in the overhead introduced with shared processor partitioning is cache thrashing. Effectively, each operating system has a set of unique storage that it typically touches when running work. In a system without shared processor logical partitioning, the hardware caches of the system tend to do a good job of containing a set of unique storage, or footprint. However, with shared processor logical partitioning, the firmware dispatches and undispatches physical processors to different operating systems over time, which tends to reduce the effectiveness of the hardware caches.

SUMMARY

In one illustrative embodiment, a method for dispatching a software thread to a logical processor in a shared processor logical partition is provided. Responsive to a software thread being made ready to run by an operating system, the method identifies a last logical processor on which the software thread was last dispatched. The method also determines whether the last logical processor on which the software thread was dispatched is idle. Responsive to a determination that the last logical processor on which the software thread was dispatched is not idle, the method selects a logical processor that is idle, is currently dispatched on a physical processor to the operating system, and shares cache with the last logical processor on which the software thread was dispatched, and queues the software thread to run on the selected logical processor. Responsive to a determination that the last logical processor on which the software thread was dispatched is idle, the method determines whether the last logical processor on which the software thread was dispatched is currently dispatched on a physical processor to the operating system. Responsive to a determination that the last logical processor on which the software thread was dispatched is not currently dispatched to the operating system, the method selects a logical processor that is idle, is currently dispatched on a physical processor to the operating system, and shares cache with the last logical processor on which the software thread was dispatched, and queues the software thread to run on the selected logical processor. Responsive to a determination that the last logical processor on which the software thread was dispatched is currently dispatched on a physical processor to the operating system, the method queues the software thread to run on the last logical processor on which the software thread was dispatched.

In another illustrative embodiment, an apparatus for dispatching a software thread to a logical processor in a shared processor logical partition is provided. The apparatus may comprise an operating system running in a shared processor logical partition and a server firmware that dispatches resources to the operating system. Responsive to a software thread being made ready to run, the operating system identifies a last logical processor on which the software thread was last dispatched. The operating system determines whether the last logical processor on which the software thread was dispatched is idle. Responsive to a determination that the last logical processor on which the software thread was dispatched is not idle, the operating system selects a logical processor that is idle, is currently dispatched on a physical processor to the operating system, and shares cache with the last logical processor on which the software thread was dispatched, and queues the software thread to run on the selected logical processor. Responsive to a determination that the last logical processor on which the software thread was dispatched is idle, the operating system determines whether the last logical processor on which the software thread was dispatched is currently dispatched on a physical processor to the operating system. Responsive to a determination that the last logical processor on which the software thread was dispatched is not currently dispatched to the operating system, the operating system selects a logical processor that is idle , is currently dispatched on a physical processor to the operating system, and shares cache with the last logical processor on which the software thread was dispatched, and queues the software thread to run on the selected logical processor. Responsive to a determination that the last logical processor on which the software thread was dispatched is currenty dispatched on a physical processor to the operating system the operating system queues the software thread to run on the last logical processor on which the software thread was dispatched.

In other exemplary embodiments, the apparatus performs various ones of the operations outlined above with regard to the method in the illustrative embodiments.

In another illustrative embodiment, a computer program product comprising a computer useable medium having a computer readable program is provided. The computer readable program, when executed on a computing device, may cause the computing device to responsive to a software thread being made ready to run by operating system, identify a last logical processor on which the software thread was dispatched. The computer readable program may also cause the computing device to determine whether the last logical processor on which the software thread was dispatched is idle. Responsive to a determination that the last logical processor on which the software thread was dispatched is not idle, the computer readable program may also cause the computing device to select a logical processor that is idle, is currently dispatched on a physical processor to the operating system, and shares cache with the last logical processor on which the software thread was dispatched, and queue the software thread to run on the selected logical processor. Responsive to a determination that the last logical processor on which the software thread was dispatched is idle, the computer readable program may also cause the computing device to determine whether the last logical processor on which the software thread was dispatched is currently dispatched on a physical processor to the operating system. Responsive to a determination that the last logical processor on which the software thread was dispatched is not currently dispatched to the operating system, the computer readable program may also cause the computing device to select a logical processor that is idle, is currently dispatched on a physical processor to the operating system, and shares cache with the last logical processor on which the software thread was dispatched, and queue the software thread to run on the selected logical processor. Responsive to a determination that the last logical processor on which the software thread was dispatched is currenty dispatched on a physical processor to the operating system, the computer readable program may also cause the computing device to queue the software thread to run on the last logical processor on which the software thread was dispatched.

In other exemplary embodiments, the computer readable program may cause the computing device to perform various ones of the operations outlined above with regard to the method in the illustrative embodiments.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENTS

Figure 1:
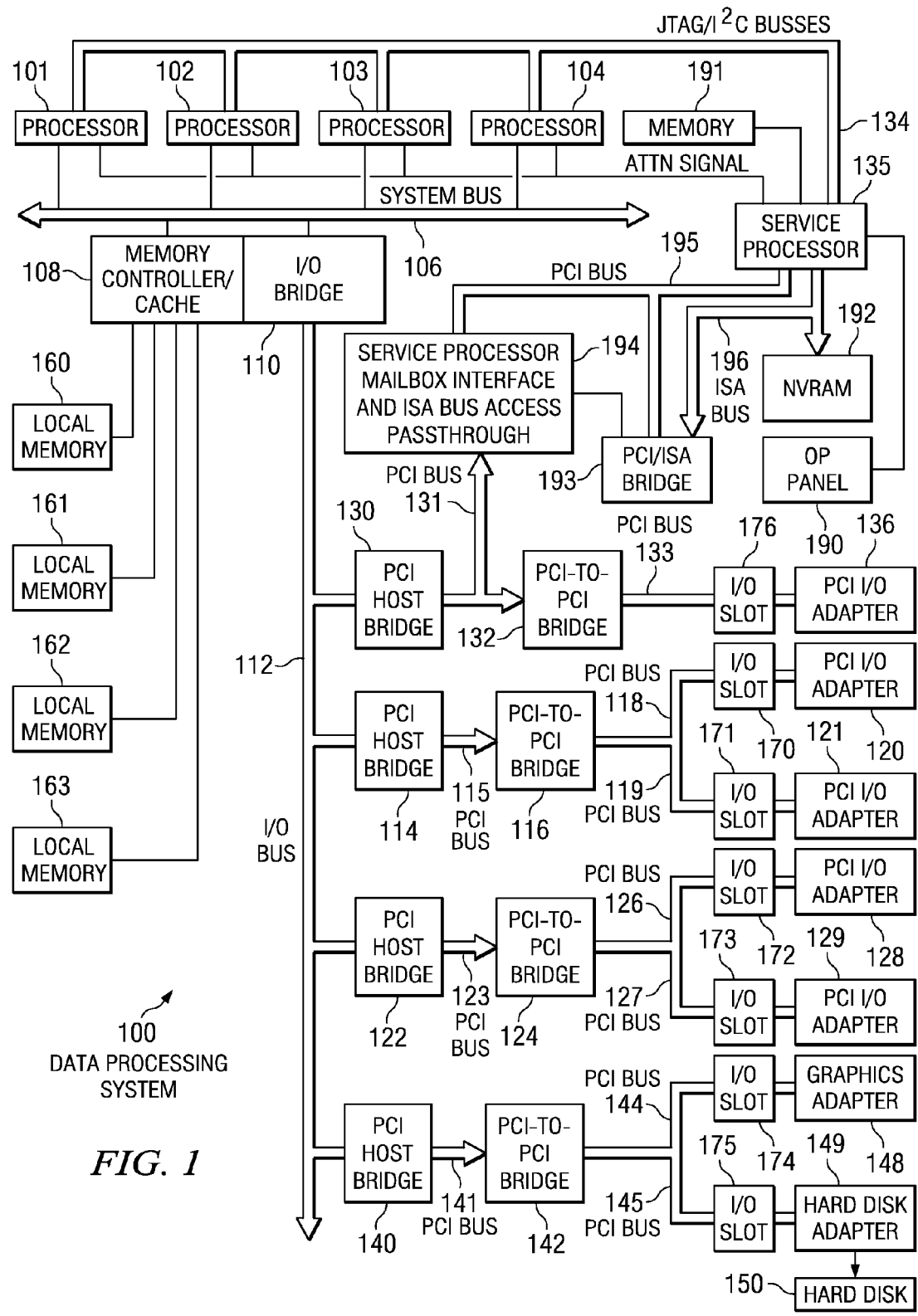
FIG. 1 is a block diagram of a data processing system in which exemplary aspects of the illustrative embodiments may be implemented.
Figure 2:
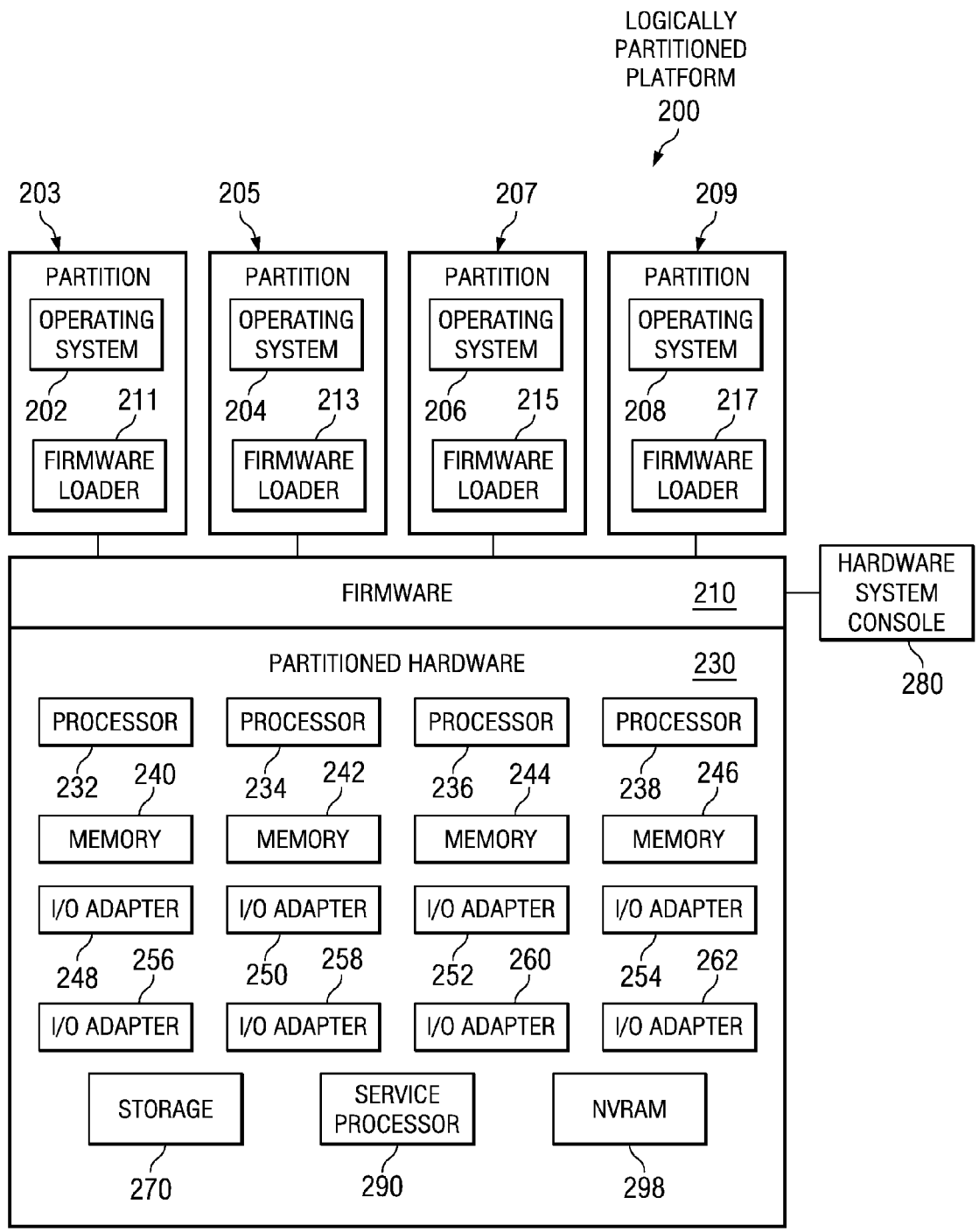
FIG. 2 is a block diagram of an exemplary logical partitioned platform in which exemplary aspects of the illustrative embodiments may be implemented.

The illustrative embodiments described herein provide mechanisms for optimization of thread wake up for shared processor partitions. As such, the mechanisms of the illustrative embodiments are especially well suited for implementation in a logically partitioned data processing system. The following FIGS. 1 and 2 are provided as examples of a logically partitioned data processing system in which exemplary aspects of the illustrative embodiments may be implemented. It should be noted that the example computing environments illustrated in FIGS. 1 and 2 are not intended to state or imply any limitation as to the particular types of computing environments in which the exemplary aspects of the illustrative embodiments may be implemented. Rather, many modifications to the depicted computing environments may be made without departing from the spirit and scope of the present invention.

With reference now to the figures, and in particular with reference to FIG. 1, a block diagram of a data processing system in which exemplary aspects of the illustrative embodiments may be implemented is depicted. Data processing system 100 may be a symmetric multiprocessor (SMP) system including a plurality of processors 101, 102, 103, and 104 connected to system bus 106. For example, data processing system 100 may be an IBM eServer™ data processing system, a product of International Business Machines Corporation in Armonk, N.Y., implemented as a server within a network. "eServer" is a trademark of International Business Machines Corporation in the United States, other countries, or both. Alternatively, a single processor system may be employed. Also connected to system bus 106 is memory controller/cache 108, which provides an interface to a plurality of local memories 160-163. I/O bus bridge 110 is connected to system bus 106 and provides an interface to I/O bus 112. Memory controller/cache 108 and I/O bus bridge 110 may be integrated as depicted.

Data processing system 100 is a logical partitioned (LPAR) data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different resources, such as processors 101-104, PCI I/O adapters 120-121, 128-129, and 136, graphics adapter 148, and hard disk adapter 149 may be assigned to different logical partitions. In this case, graphics adapter 148 provides a connection for a display device (not shown), while hard disk adapter 149 provides a connection to control hard disk 150.

Thus, for example, suppose data processing system 100 is divided into three logical partitions, P1, P2, and P3. Each of PCI I/O adapters 120-121, 128-129, 136, graphics adapter 148, hard disk adapter 149, each of host processors 101-104, and memory from local memories 160-163, or portions thereof, is assigned to one of the three partitions. In these examples, memories 160-163 may take the form of dual in-line memory modules (DIMMs). DIMMs are not normally assigned on a per DIMM basis to partitions. Instead, a partition will get a portion of the overall memory seen by the platform. For example, processor 101, some portion of memory from local memories 160-163, and I/O adapters 120, 128, and 129 may be assigned to logical partition P1; processors 102-103, some portion of memory from local memories 160-163, and PCI I/O adapters 121 and 136 may be assigned to partition P2; and processor 104, some portion of memory from local memories 160-163, graphics adapter 148 and hard disk adapter 149 may be assigned to logical partition P3. Although not depicted in FIG. 1, portions of remote memories (not shown) may also be assigned to logical partitions, such as P1 or P2 in the illustrative example.

Each operating system executing within data processing system 100 is assigned to a different logical partition. Thus, each operating system executing within data processing system 100 may access only those I/O units that are within its logical partition. For example, one instance of the Advanced Interactive Executive (AIX®) operating system may be executing within partition P1, a second instance (image) of the AIX® operating system may be executing within partition P2, and a Windows® XP operating system may be operating within logical partition P3. Windows® XP is a product and trademark of Microsoft Corporation of Redmond, Wash. "AIX" is a registered trademark of International Business Machines Corporation in the United States, other countries, or both. "WINDOWS" is a registered trademark of Microsoft Corporation in the United States, other countries, or both.

Peripheral component interconnect (PCI) host bridge 114 connected to I/O bus 112 provides an interface to PCI local bus 115. A number of PCI input/output adapters 120-121 may be connected to PCI bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations will support between four and eight I/O adapters (i.e. expansion slots for add-in connectors). Each PCI I/O adapter 120-121 provides an interface between data processing system 100 and input/output devices such as, for example, other network computers, which are clients to data processing system 100.

An additional PCI host bridge 122 provides an interface for an additional PCI bus 123. PCI bus 123 is connected to a plurality of PCI I/O adapters 128-129. PCI I/O adapters 128-129 may be connected to PCI bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. Additional I/O devices, such as, for example, modems or network adapters may be supported through each of PCI I/O adapters 128-129. In this manner, data processing system 100 allows connections to multiple network computers.

A memory mapped graphics adapter 148 inserted into I/O slot 174 may be connected to I/O bus 112 through PCI bus 144, PCI-to-PCI bridge 142, PCI bus 141 and PCI host bridge 140. Hard disk adapter 149 may be placed into I/O slot 175, which is connected to PCI bus 145. In turn, this bus is connected to PCI-to-PCI bridge 142, which is connected to PCI host bridge 140 by PCI bus 141.

A PCI host bridge 130 provides an interface for a PCI bus 131 to connect to I/O bus 112. PCI I/O adapter 136 is connected to I/O slot 176, which is connected to PCI-to-PCI bridge 132 by PCI bus 133. PCI-to-PCI bridge 132 is connected to PCI bus 131. This PCI bus also connects PCI host bridge 130 to the service processor mailbox interface and ISA bus access pass-through logic 194 and PCI-to-PCI bridge 132.

Service processor mailbox interface and ISA bus access pass-through logic 194 forwards PCI accesses destined to the PCI/ISA bridge 193. NVRAM storage 192 is connected to the ISA bus 196. Service processor 135 is coupled to service processor mailbox interface and ISA bus access pass-through logic 194 through its local PCI bus 195. Service processor 135 is also connected to processors 101-104 via a plurality of JTAG/I²C busses 134. JTAG/I²C busses 134 are a combination of JTAG/scan busses (see IEEE 1149.1) and Phillips I²C busses. However, alternatively, JTAG/I²C busses 134 may be replaced by only Phillips I²C busses or only JTAG/scan busses. All SP-ATTN signals of the host processors 101, 102, 103, and 104 are connected together to an interrupt input signal of the service processor. The service processor 135 has its own local memory 191, and has access to the hardware OP-panel 190.

When data processing system 100 is initially powered up, service processor 135 uses the JTAG/I²C busses 134 to interrogate the system (host) processors 101-104, memory controller/cache 108, and I/O bridge 110. At completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 101-104, memory controller/cache 108, and I/O bridge 110. Any error information for failures detected during the BISTs, BATs, and memory tests are gathered and reported by service processor 135.

A meaningful/valid configuration of system resources is still possible after taking out the elements found to be faulty during the BISTs, BATs, and memory tests. Then data processing system 100 is allowed to proceed to load executable code into local (host) memories 160-163. Service processor 135 then releases host processors 101-104 for execution of the code loaded into local memory 160-163. While host processors 101-104 are executing code from respective operating systems within data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101-104, local memories 160-163, and I/O bridge 110.

Service processor 135 is responsible for saving and reporting error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap."

Data processing system 100 may be implemented using various commercially available computer systems. For example, data processing system 100 may be implemented using IBM eServer™ i5 or eServer™ p5 server models available from International Business Machines Corporation. Such a system may support logical partitioning using an AIX® operating system or an i5/OS™ operating system which are also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

With reference now to FIG. 2, a block diagram of an exemplary logical partitioned platform is depicted in which exemplary aspects of the illustrative embodiments may be implemented. The hardware in logical partitioned platform 200 may be implemented as, for example, data processing system 100 in FIG. 1. Logical partitioned platform 200 includes partitioned hardware 230, operating systems 202, 204, 206, 208, and firmware 210. Operating systems 202, 204, 206, and 208 may be multiple copies of a single operating system or multiple heterogeneous operating systems simultaneously running on platform 200. These operating systems may be implemented using the AIX® operating system, the i5/OS™ operating system or the Linux™ operating system, for example, which are designed to interface with server firmware. Operating systems 202, 204, 206, and 208 are located in partitions 203, 205, 207, and 209.

Additionally, these partitions also include firmware loaders 211, 213, 215, and 217. Firmware loaders 211, 213, 215, and 217 may be implemented using IEEE-1275 Standard Open Firmware and runtime abstraction software (RTAS), which is available from International Business Machines Corporation. When partitions 203, 205, 207, and 209 are instantiated, a copy of the open firmware is loaded into each partition by the firmware's partition manager. The processors associated or assigned to the partitions are then dispatched to the partition's memory to execute the partition firmware.

Firmware 210 performs a number of functions and services for partitions 203, 205, 207, and 209 to create and enforce the partitioning of logical partitioned platform 200. Firmware 210 is a firmware implemented virtual machine identical to the underlying hardware. Hypervisor software is an example of server firmware available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM). Thus, firmware 210 allows the simultaneous execution of independent operating system images 202, 204, 206, and 208 by virtualizing all hardware resources of logical partitioned platform 200. Virtualization is the pooling of data processing resources in a way that shields the physical nature and boundaries of those resources from operating systems and users.

Operations of the different partitions may be controlled through a hardware management console, such as hardware management console 280. Hardware management console 280 is a separate data processing system from which a system administrator may perform various functions including reallocation of resources to different partitions. Alternatively, a Virtual Partition Manager is a feature of the i5/OS™ V5R3 operating system that allows one to create and manage one operating system logical partitions by initiating a console session using service tools.

Partitioned hardware 230 includes a plurality of processors 232-238, a plurality of system memory units 240-246, a plurality of input/output (I/O) adapters 248-262, and a storage unit 270. Partitioned hardware 230 also includes service processor 290, which may be used to provide various services, such as processing of errors in the partitions. Each of the processors 232-238, memory units 240-246, NVRAM storage 298, and I/O adapters 248-262 may be assigned to one of multiple partitions within logical partitioned platform 200, each of which corresponds to one of operating systems 202, 204, 206, and 208.

Processors 232-238 may be dispatched to partitions 203, 205, 207, 209 as dedicated processors or shared processors. Dedicated processors are whole processors that are assigned to a single partition. Shared processors are physical processors whose processing capacity is shared among multiple logical partitions. The ability to divide physical processors and share them among multiple logical partitions is known as Micro-Partitioning™ or shared processor logical partitioning (SPLPAR). The shared processor pool includes all processors in partitioned hardware 230 that are not dedicated to specific logical partitions or reserved for capacity on demand. Each logical partition that uses the shared processor pool is assigned a specific amount of processor power from the shared processor pool that is guaranteed available, in required.

Figure 3A:
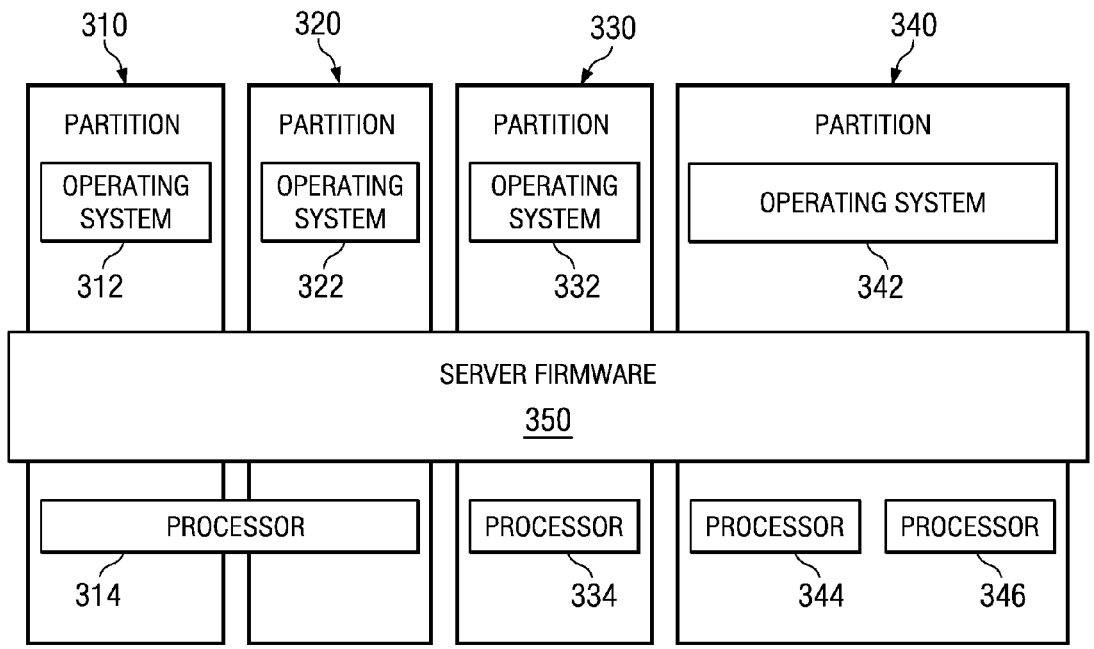
FIG. 3A illustrates an example logically partitioned data processing system with dedicated processors and shared processors in accordance with an illustrative embodiment.

FIG. 3A illustrates an example logically partitioned data processing system with dedicated processors and shared processors in accordance with an illustrative embodiment. Partition 310 runs operating system 312; partition 320 runs operating system 322; partition 330 runs operating system 332; and, partition 340 runs operating system 342. Server firmware 350 may dispatch processor 334 to partition 330 and processors 344 and 346 to partition 340 as dedicated processors. Server firmware 350 may dispatch processor 314 to partitions 310 and 320 from a shared processor pool including all processors not assigned as dedicated processors (i.e. all processors except processors 334, 344, 346).

Because operating systems 332 and 342 are assigned dedicated processors, these operating systems may make safe assumptions about cache affinity when dispatching threads to their logical processors. In the depicted example, a logical processor may be a whole physical processor or a portion of a physical processor. For example, a logical processor may be a given core of a multiple core processor or a given hardware thread in a multi-threading processor. However, the manner in which physical processors are divided into logical processors is not a focus of this disclosure.

For simplicity, consider a single operating system function that is used to place a thread, which was waiting on an event and is now ready to run, on a logical processor. For operating systems running with dedicated processor resources, the approach is to identify a logical processor that is idle. Additionally, the operating system biases the placement to try to place the thread onto the logical processor (or virtual processor) on which the thread last ran or processors associated with caches where the thread last ran. This preserves cache affinity in dedicated processor partitions.

On the other hand, operating systems 312 and 322 are assigned logical processors for their tasks from a shared processor pool. In the depicted example, a logical processor may be a portion of a physical processor. For example, a logical processor may be a given core of a multiple core processor or a given hardware thread in a multi-threading processor. As another example, a logical processor may be a time-sliced portion of a physical processor or processing core. For instance, processor 314 may be a single physical processor that is time sliced to form virtual processors for partitions 310 and 320. In this instance, each partition may receive 50% of processor 314 time-wise. That is, partition 310 may receive a 10 ms time slice and then partition 320 may receive a 10 ms time slice and so on. However, the manner in which physical processors are divided into logical processors is not a focus of this disclosure.

Figure 3B:
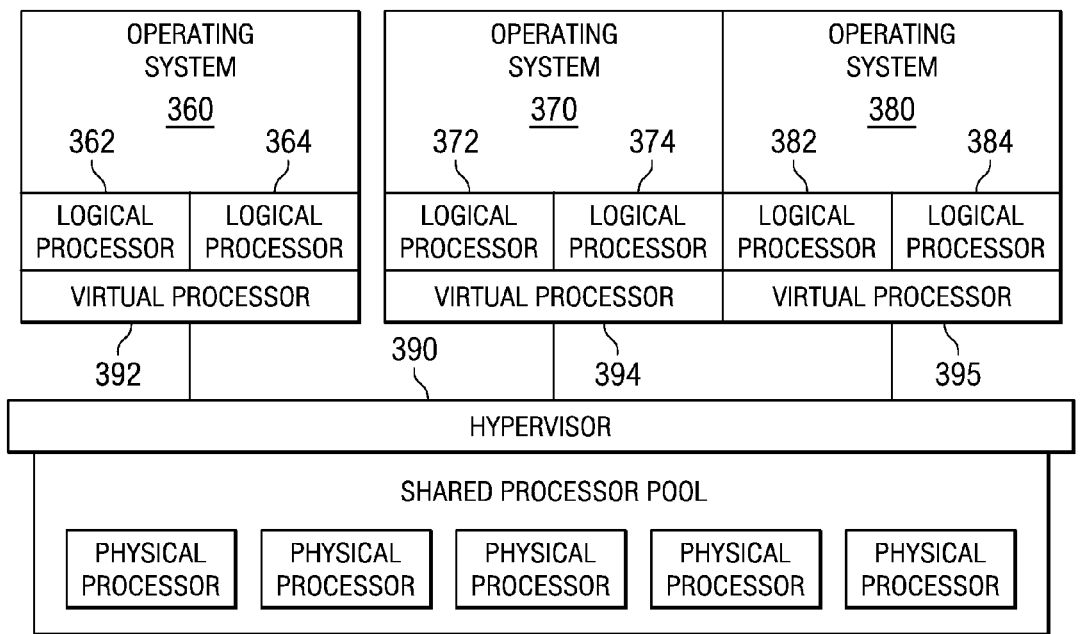
FIG. 3B depicts a logically partitioned data processing system with shared processors illustrating an exemplary configuration of logical processors, virtual processors, and physical processors in accordance with an illustrative embodiment.

FIG. 3B depicts a logically partitioned data processing system with shared processors illustrating an exemplary configuration of logical processors, virtual processors, and physical processors in accordance with an illustrative embodiment. In the depicted example, operating system 360 runs on logical processors 362 and 364, operating system 370 runs on logical processors 372 and 374, and operating system 380 runs on logical processors 382 and 384. That is, operating system 360, for example, sees logical processor 362 and logical processor 364 as available processors on which to run software threads.

Logical processors are the processors that operating systems operate on and sit on top of virtual processors. In the depicted example, logical processors 362 and 364 sit on top of virtual processor 392, and logical processors 372, 374, 382, and 384 sit on top of virtual processors 394, 395.

Hypervisor 390, which is an example of server firmware, virtualizes the physical resources. Hypervisor 390 assigns physical processors from shared processor pool 396 to operating systems 360, 370, and 380 as virtual processors 392, 394, 395. A virtual processor may be a physical processor (in a dedicated processor partition), a core of a multiple core processor, or a time slice of a physical processor, for example. A logical processor may be, for example, a hardware thread in a multithreading processor or a time slice of the virtual processor, which, in turn, could be a time slice of a physical processor.

When running in a shared processor logical partitioning environment, the value of cache affinity is difficult to predict. This is due to the fact that the server firmware dispatches virtual processors on the physical hardware. In fact, for transactional workloads using databases or application servers, the server firmware dispatchers' effective affinity when placing the virtual processors may be very poor. This is a consequence of the fact that it is difficult to fully utilize the system in transactional environments, since the response time for transactions rises with processor utilization. That tends to increase the context switch rate (e.g., the hypervisor dispatches and undispatches of virtual processors). On systems running at high utilization (a goal of virtualization), the server firmware usually has a limited set of idle physical processors to dispatch at any given time, since most of the physical processors are currently busy.

Consequently, if an operating system queues a software thread to be run on one of its virtual processors, that virtual processor may be undispatched due to hypervisor actions (e.g. time sliced). Additionally, the virtual processor may have ceded to the hypervisor due to being idle and, thus, be undispatched. In this case, the operating system must send a call, such as a PROD call to the server firmware to tell the server firmware that the logical processor now needs to run. The overhead of the context switch for undispatching the physical processor from the other logical partition and then dispatching the logical processor may far outweigh the benefit of cache affinity, if any. Even if the logical processor is currently dispatched it may very well be running another software thread within the same partition.

In accordance with an exemplary embodiment, the operating system determines if some idle logical processor is currently dispatched by the server firmware. Frequently, there may be logical processors dispatched that are idle. In one example, this may be due to multithreading requiring that both logical processors in a virtual processor are dispatched together in the POWER5™ processor; however, this could be the case in other architectures as well.

If the logical processor on which the software thread last ran is not currently dispatched to the operating system, or is not currently idle, the operating system may bias placing the software thread on a currently running, idle logical processor, if possible. This reduces the number of context switches of virtual processors through the server firmware.

Figure 4:
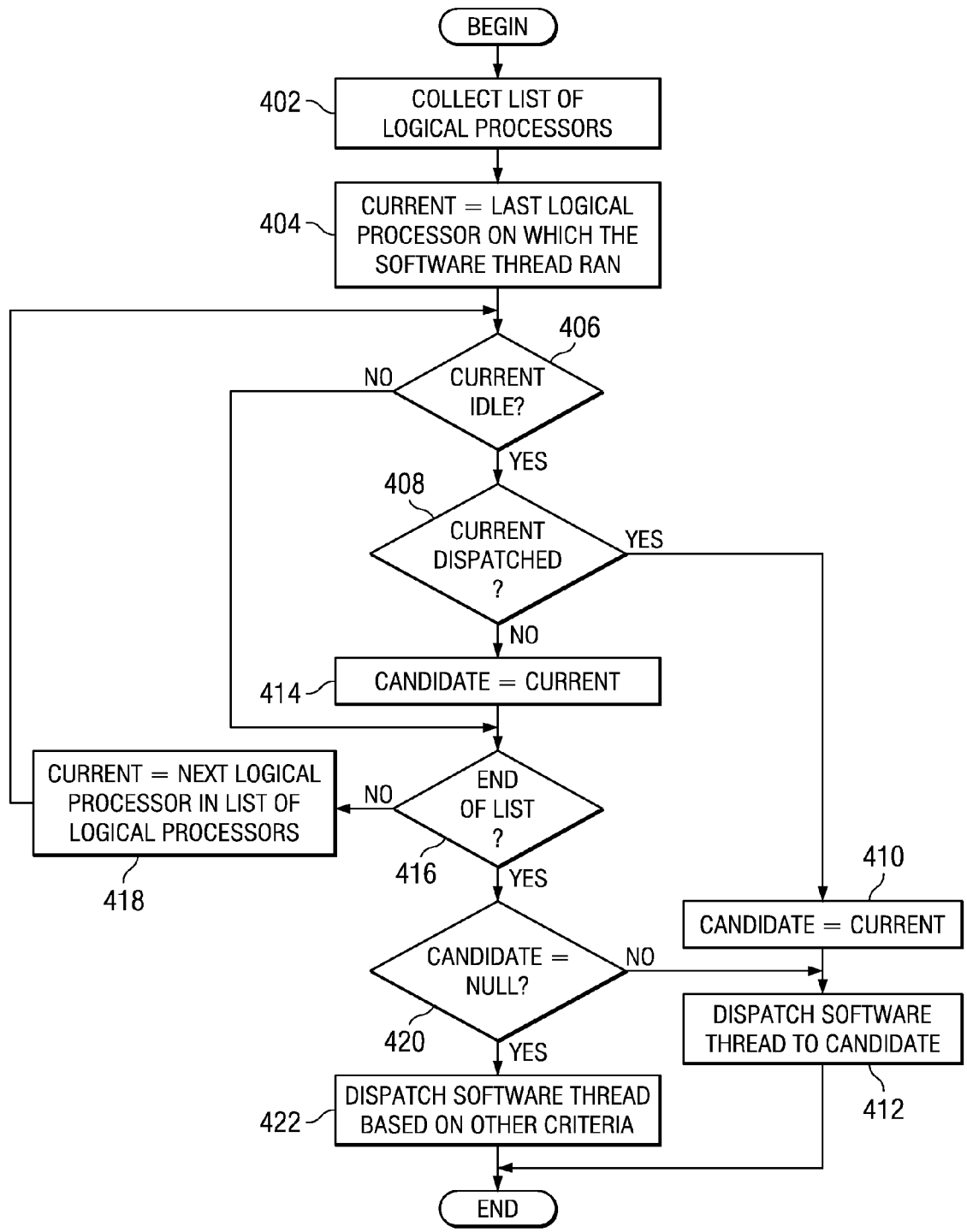
FIG. 4 is a flowchart illustrating operation of an operating system for dispatching a software thread in accordance with an exemplary embodiment.

FIG. 4 is a flowchart illustrating operation of an operating system for dispatching a software thread in accordance with an exemplary embodiment. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be embodied in a computer-readable memory, storage medium, or transmission medium that can direct a processor or other programmable data processing apparatus to function in a particular manner, such that the instructions stored in the computer-readable memory, storage medium, or transmission medium produce an article of manufacture including instruction means that implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

With particular reference to FIG. 4, operation begins when an operating system is ready to dispatch a software thread to a logical processor. The operating system collects a list of logical processors (block 402). The operating system starts with the last logical processor on which the software thread ran as the current logical processor being considered (block 404).

The operating system determines whether the current logical processor is idle (block 406). If the current logical processor is idle, the operating system determines whether the current logical processor is currently dispatched on a physical processor by the server firmware (block 408). If the current logical processor is dispatched, then the operating system sets the current logical processor as the candidate logical processor (block 410) and dispatches the software thread to the candidate logical processor (block 412). Thereafter, operation ends. In the first iteration, blocks 406 and 408 determine whether the last logical processor on which the software thread ran is idle and currently dispatched on a physical processor by the server firmware to the operating system. These are ideal conditions, as the software thread may run immediately without the cost of a context switch and may get the benefit of cache affinity, if any.

If the current logical processor is not dispatched on a physical processor to the operating system in block 408, the operating system sets the current logical processor as the candidate logical processor (block 414). Next, the operating system determines whether the end of the list of logical processors is reached (block 416). Returning to block 406, if the current logical processor is not idle, then operation proceeds directly to block 416 to determine whether the end of the list of logical processors is reached.

If the end of the list of logical processors is not reached in block 416, the operating system considers the next logical processor in the list as the current logical processor (block 418), and operation returns to block 406 to determine whether the current logical processor is idle. This process repeats until the operating system finds a logical processor that is idle and currently dispatched to the operating system. Ideally, this is the first logical considered, which is the last logical processor on which the software thread ran. However, if the last logical processor on which the software thread ran is not idle or is not currently dispatched, then the operating system biases placing the software thread onto a currently idle and dispatched logical processor.

If the end of the list is reached in block 416, then the operating system did not find a logical processor that is idle and currently dispatched. In this instance, the operating system determines whether candidate is NULL (block 420). In other words, the operating system determines whether a logical processor was found that was idle (block 406) and dispatched (block 408), and was set as a candidate in block 414. If a candidate logical processor exists in block 420, then the operating system dispatches the software thread to the candidate logical processor (block 412), and operation ends. In one exemplary embodiment, if multiple logical processors are candidates (i.e. idle), the operating system may bias placement of the software thread to a logical processor that shares cache with the last virtual processor on which it ran. If a large number of virtual processors exist in the partition, the operating system may only examine a subset of the available logical processors for efficiency reasons.

If a candidate logical processor does not exist in block 420, then the operating system dispatches the software thread based on other criteria (block 422). These other criteria may include, for example, best software priority fit, optimum usage of logical processors to improve overall system throughput, or any other standard operating system criteria. Thereafter, operation ends. In this case, the operating system may simply run the software thread on the last logical processor on which the software thread ran, because there is no currently idle logical processor.

Thus, the exemplary embodiments solve the disadvantages of the prior art by providing a mechanism for biasing placement of a software thread on a currently idle and dispatched processor. The operating system starts with the last logical processor on which the software thread ran and determines whether that processor is idle and dispatched and considers each logical processor until a currently dispatched and idle logical processor is found. If a currently dispatched and idle logical processor is not found, then the operating system biases placing the software thread on an idle logical processor. This optimization works best when the operating system is running at moderate processor utilization, which is typical for customer environments.

It is important to note that the illustrative embodiments may take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

As described previously, a data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for dispatching a software thread to a logical processor in a shared processor logical partition, the method comprising:
    collecting a list of logical processors;
    responsive to a software thread being made ready to run by an operating system, identifying a last logical processor on which the software thread was last dispatched;
    determining whether the last logical processor on which the software thread was dispatched is idle;
    responsive to a determination that the last logical processor on which the software thread was dispatched is not idle, selecting a logical processor that is idle, is currently dispatched on a physical processor to the operating system, and shares cache with the last logical processor on which the software thread was dispatched, and queuing the software thread to run on the selected logical processor;
    responsive to a determination that the last logical processor on which the software thread was dispatched is idle, determining whether the last logical processor on which the software thread was dispatched is currently dispatched on a physical processor to the operating system;
    responsive to a determination that the last logical processor on which the software thread was dispatched is not currently dispatched to the operating system, selecting a logical processor that is idle, is currently dispatched on a physical processor to the operating system, and shares cache with the last logical processor on which the software thread was dispatched, and queuing the software thread to run on the selected logical processor; and
    responsive to a determination that the last logical processor on which the software thread was dispatched is currently dispatched on a physical processor to the operating system, queuing the software thread to run on the last logical processor on which the software thread was dispatched.

2. The method of claim 1, further comprising:
    responsive to a determination that the last logical processor on which the software thread was dispatched is not currently dispatched to the operating system and that a logical processor that is idle and currently dispatched on a physical processor to the operating system does not exist, selecting a non-idle logical processor currently dispatched on a physical processor to the operating system; and
    queuing the software thread to run on the selected non-idle logical processor.

3. The method of claim 2, wherein selecting the non-idle logical processor currently dispatched on a physical processor to the operating system comprises selecting the non-idle processor based on optimum usage of logical processors to improve overall system throughput.

4. An apparatus for dispatching a software thread to a logical processor in a shared processor logical partition, the apparatus comprising:
    an operating system running in a shared processor logical partition; and
    a server firmware that dispatches resources to the operating system,
    wherein the server firmware collects a list of logical processors;
    wherein responsive to a software thread being made ready to run, the operating system identifies a last logical processor on which the software thread was last dispatched;
    wherein the operating system determines whether the last logical processor on which the software thread was dispatched is idle;
    wherein responsive to a determination that the last logical processor on which the software thread was dispatched is not idle, the operating system selects a logical processor that is idle, is currently dispatched on a physical processor to the operating system, and shares cache with the last logical processor on which the software thread was dispatched, and queues the software thread to run on the selected logical processor;
    wherein responsive to a determination that the last logical processor on which the software thread was dispatched is idle, the operating system determines whether the last logical processor on which the software thread was dispatched is currently dispatched on a physical processor to the operating system;
    wherein responsive to a determination that the last logical processor on which the software thread was dispatched is not currently dispatched to the operating system, the operating system selects a logical processor that is idle, is currently dispatched on a physical processor to the operating system, and shares cache with the last logical processor on which the software thread was dispatched, and queues the software thread to run on the selected logical processor; and
    wherein responsive to a determination that the last logical processor on which the software thread was dispatched is currently dispatched on a physical processor to the operating system, the operating system queues the software thread to run on the last logical processor on which the software thread was dispatched.

5. The apparatus of claim 4, wherein responsive to a determination that the last logical processor on which the software thread was dispatched is not currently dispatched to the operating system and that a logical processor that is idle and currently dispatched on a physical processor to the operating system does not exist, the operating system selects a non-idle logical processor currently dispatched on a physical processor to the operating system and queues the software thread to run on the selected non-idle logical processor.

6. The apparatus of claim 5, wherein selecting the non-idle logical processor currently dispatched on a physical processor to the operating system comprises selecting the non-idle logical processor based on optimum usage of logical processors to improve overall system throughput.

7. A computer program product comprising a computer useable storage medium having a computer readable program stored thereon, wherein the computer readable program, when executed on a computing device, causes the computing device to:
collecting a list of logical processors;
responsive to a software thread being made ready to run by an operating system, identify a last logical processor on which the software thread was dispatched;
determine whether the last logical processor on which the software thread was dispatched is idle;
responsive to a determination that the last logical processor on which the software thread was dispatched is not idle, select a logical processor that is idle, is currently dispatched on a physical processor to the operating system, and shares cache with the last logical processor on which the software thread was dispatched, and queue the software thread to run on the selected logical processor;
responsive to a determination that the last logical processor on which the software thread was dispatched is idle, determine whether the last logical processor on which the software thread was dispatched is currently dispatched on a physical processor to the operating system;
responsive to a determination that the last logical processor on which the software thread was dispatched is not currently dispatched to the operating system, select a logical processor that is idle, is currently dispatched on a physical processor to the operating system, and shares cache with the last logical processor on which the software thread was dispatched, and queue the software thread to run on the selected logical processor; and
responsive to a determination that the last logical processor on which the software thread was dispatched is currently dispatched on a physical processor to the operating system, queue the software thread to run on the last logical processor on which the software thread was dispatched.

8. The computer program product of claim 7, wherein the computer readable program further causes the computing device to:
responsive to a determination that the last logical processor on which the software thread was dispatched is not currently dispatched to the operating system and that a logical processor that is idle and currently dispatched on a physical processor to the operating system does not exist, select a non-idle logical processor currently dispatched on a physical processor to the operating system and queue the software thread to run on the selected non-idle logical processor.

9. The computer program product of claim 8, wherein selecting the non-idle logical processor currently dispatched on a physical processor to the operating system comprises selecting the non-idle logical processor based on optimum usage of logical processors to improve overall system throughput.

* * * * *